(12) United States Patent
Zanolla et al.

(10) Patent No.: US 6,349,534 B1
(45) Date of Patent: Feb. 26, 2002

(54) METAL COMPOSITE CABLE CARRIER

(75) Inventors: Mark A. Zanolla, Hobart, IN (US);
James D. O'Rourke, Pewaukee; Bart C. Bohne, Milwaukee, both of WI (US)

(73) Assignee: A&A Manufacturing Co., Inc., New Berlin, WI (US)

( * ) Notice: Subject to any disclaimer, the term of this patent is extended or adjusted under 35 U.S.C. 154(b) by 0 days.

(21) Appl. No.: 09/487,751

(22) Filed: Jan. 19, 2000

Related U.S. Application Data
(60) Provisional application No. 60/152,527, filed on Sep. 3, 1999.

(51) Int. Cl.[7] .................................................. F16G 13/16
(52) U.S. Cl. .............................. 59/78.1; 248/49; 248/51
(58) Field of Search ............................ 59/78.1; 248/49, 248/51

(56) References Cited

U.S. PATENT DOCUMENTS

| | | | |
|---|---|---|---|
| 3,779,003 A | 12/1973 | Boissevain et al. | 59/78.1 |
| 3,921,388 A | 11/1975 | Loos et al. | 59/78.1 |
| 4,311,293 A | 1/1982 | Tenniswood | 248/49 |
| 4,499,720 A | 2/1985 | Klein | 59/78.1 |
| 4,570,437 A | 2/1986 | Moritz | 59/78.1 |
| 4,590,961 A | 5/1986 | Schumann | 59/78.1 |
| 4,625,507 A | 12/1986 | Moritz et al. | 59/78.1 |
| 4,626,233 A | 12/1986 | Moritz | 474/206 |
| 4,800,714 A | 1/1989 | Moritz | 59/78.1 |
| 4,807,432 A | 2/1989 | Mauri | 59/78.1 |
| 5,016,841 A | 5/1991 | Schumann et al. | 248/51 |
| 5,108,350 A | 4/1992 | Szpakowski | 474/207 |
| 5,184,454 A | 2/1993 | Klein et al. | 59/78.1 |
| 6,161,372 A | * 12/2000 | Wehler | 59/78.1 |

FOREIGN PATENT DOCUMENTS

WO    WO 98/38440    * 9/1998

* cited by examiner

*Primary Examiner*—David Jones
(74) *Attorney, Agent, or Firm*—Quarles & Brady LLP

(57) ABSTRACT

A composite cable carrier for supporting flexible cable, hoses or other conduit is made of two parallel chains of metal side links that are pivotally joined end to end. The links are connected by snap-on nylon retainer clips, rivets or pins, and the chains are joined laterally by snap-on nylon cross-bars. Stop posts of outer plates extend into slots of inner plates from both sides, with sharp 90° inside and outside corners for improved load handling ability. Integrally formed straps may be provided for added strength of the stop posts, and the straps are oriented along radials of the link pivot. The metal-nylon composite carrier is strong but light-weight, having a high load capacity so that it can be used in applications with heavy cables and/or long unsupported spans.

18 Claims, 8 Drawing Sheets

METAL COMPOSITE CABLE CARRIER

CROSS-REFERENCE TO RELATED APPLICATIONS

This application claims the benefit of U.S. Provisional Patent Application No. 60/152,527 filed Sep. 3, 1999.

STATEMENT REGARDING FEDERALLY SPONSORED RESEARCH OR DEVELOPMENT

Not Applicable.

BACKGROUND OF THE INVENTION

1. Field of the Invention

This invention relates to a carrier for Supporting hoses, cables, and other conduit. Particularly, the invention is a self-supporting carrier made of parallel chains having metal links that are pivotally connected end to end and joined laterally by light-weight cross-bars.

2. Discussion of the Prior Art

Carrier chains for supporting cables, hoses and other flexible conduit extending from one location to a location movable in a relatively straight line are well known. Commonly, carriers are made up of two parallel chains of links interconnected end to end, which permit pivoting between the links in only one direction from a straight or slightly cambered extended position. The links may be designed to have limiting members of various sizes and configurations to create carrier chains with a variety of pivot radii.

The links may have grooves or other interfittinig structures with which cross-bars of various cross-sections are interconnected. A carrier is formed when one chain of connected links is laterally connected to a second chain with the chains having pivot axes in common. The carriers may be assembled, without the use of tools, by fixing a cross-bar to opposing links, for example with a snap fit, and are disassembled by reversing the process. A cross-bar may be connected to every link or fewer than every link. The cross-bars may be rib-like members that laterally connect two side chains leaving a substantially open top and bottom, or may be covers with curved ends to substantially close off the space inside the carrier.

Cable carriers are required to support cable, conduit or other lines over linear distances Without being separately supported. The weight of the lines and length of the unsupported span varies depending upon the specific application, which dictates the structural integrity and load capacity needed by the carrier. In the prior art, some cable carriers are made of plastic because they are relatively inexpensive, light-weight and easy to manufacture. Plastic carriers, however, lack the strength to support heavy loads. For such applications, all-metal cable carriers have been used. While it is true that all-metal carriers have a higher load bearing capacity, they are also more costly and heavier than the plastic carriers. While all-metal carriers have significantly higher unsupported load capacities than plastic carriers, the added weight of the metal components detracts from the carrier's overall load capacity.

SUMMARY OF THE INVENTION

The present invention provides a carrier for supporting energy transmission lines that addresses the above concerns. The carrier has at least two parallel articulated chains joined laterally to have coaxial pivot axes. Each chain is made of inner links pivotally connected end to end to outer links. Each outer link has a first half and a second half that sandwich an end of an inner link between ends of the first and second outer link halves so that the inner and outer links are pivotally connected. The outer link halves are joined together by a retainer clip or other means such as a rivet or pin through pivot holes of the chain.

In greater detail, the first and second outer link halves are identical having integral stop posts at opposing ends that are sized to fit within openings in the inner links. The stops at one end of each outer link half are disposed within the openings at an adjacent end of a mating inner link so that the inner and outer links rotate with respect to each other about a pivot axis from a straight or cambered position to an angled position. The chains are laterally joined by cross-bars to define a space in which the cables are carried. The cross-bars and retainer clips are made of a material having a lower specific gravity, or relative weight, than that from which the links are made.

Stop posts are formed in the outer links by a stamping process that creates a sharp 90° corner having a radius substantially equal to zero where the side surface of the stop meets the inner surface of the outer link. Preferably, the stamping process also provides such a corner at the outer end of the post as well. Such corners add to the load carrying, capacity of the chain without adding weight. The preferred process for forming such posts is a half-shear stamping operation, in which a depression formed on the outer side of the outer link opposite from the post is larger in diameter than the post. Preferably, an integral strap is provided to connect the post to the link, on the outer side of the link, which is the depressed side of the post.

The inner links have three, but no fewer than one, arcuate slots radially spaced around, and concentric with, a bore at the pivot axes. Pivot posts of the outer links fit within the bore of the inner link. The stop posts are radially spaced around, and concentric with, the pivots and positioned and sized to slide within the arcuate slots of the inner links. The straps of the stop posts should be oriented along a radial of the pivot. When the inner and outer links are joined, the stops slide within the slots to limit the rotation of the outer links relative to the inner links.

One object and advantage of this invention is to provide a low-weight carrier with a high load capacity. In its preferred embodiment, the inner and outer links are made of metal for added structural strength and load capacity. The weight of the carrier itself is reduced by forming cross-bars, and retainer clips if used, out of a light-weight material, such as nylon that is glass-filled for increased strength. Weight is further reduced by forming the stop (and pivot, if provided integrally) posts with sharp corners. Unwanted material weight is further decreased by a cored center through the inner and outer links. The links are reinforced by stiffening ribs disposed in the material adjacent to the cored center.

The nylon retainer clip may be all that is needed to maintain the pivotal mating of the inner links within the outer link halves. This eliminates extra fasteners and their associated cost and weight. The metal-nylon composite construction gives the carrier the capacity to bear heavy loads as well as to span large distances without external support. However, when increased load capacity or ruggedness is needed, adjacent stop or pivot posts may be secured together with a fastener.

The retainer clips are sized to snap fit to the opposing outer link halves, and the cross-bars have transverse latch members sized to snap fit to the inner links. The cross-bars can be formed to various sizes and of a range of materials having various strength properties and costs.

A further objective of the invention is to provide a simple, quick, and cost effective means for varying the width of the carrier. Simply replacing the cross-bars with longer or shorter cross-bars varies the width of the carrier. Another objective of the invention is to provide a cost-effective carrier that meets the loading or spanning requirements of various industrial applications. Thus, for example, low-cost polypropylene cross-bars can be used in light-duty applications, which can be replaced with reinforced glass-filled nylon cross-bars for applications requiring increased loading or span distance. Thus, the carrier of the present invention is easy to assemble, cost effective and of the appropriate size and strength for the application in which it is used.

The foregoing and other objects and advantages of the invention will appear from the following description. In this description reference is made to the accompanying drawings which form a part hereof and in which there is shown by way of illustration a preferred embodiment of the invention. Such embodiment does not necessarily represent the full scope of the invention, however, and reference must be made therefore to the claims for interpreting the scope of the invention.

DETAILED DESCRIPTION OF THE PREFERRED EMBODIMENT

Figure 1:
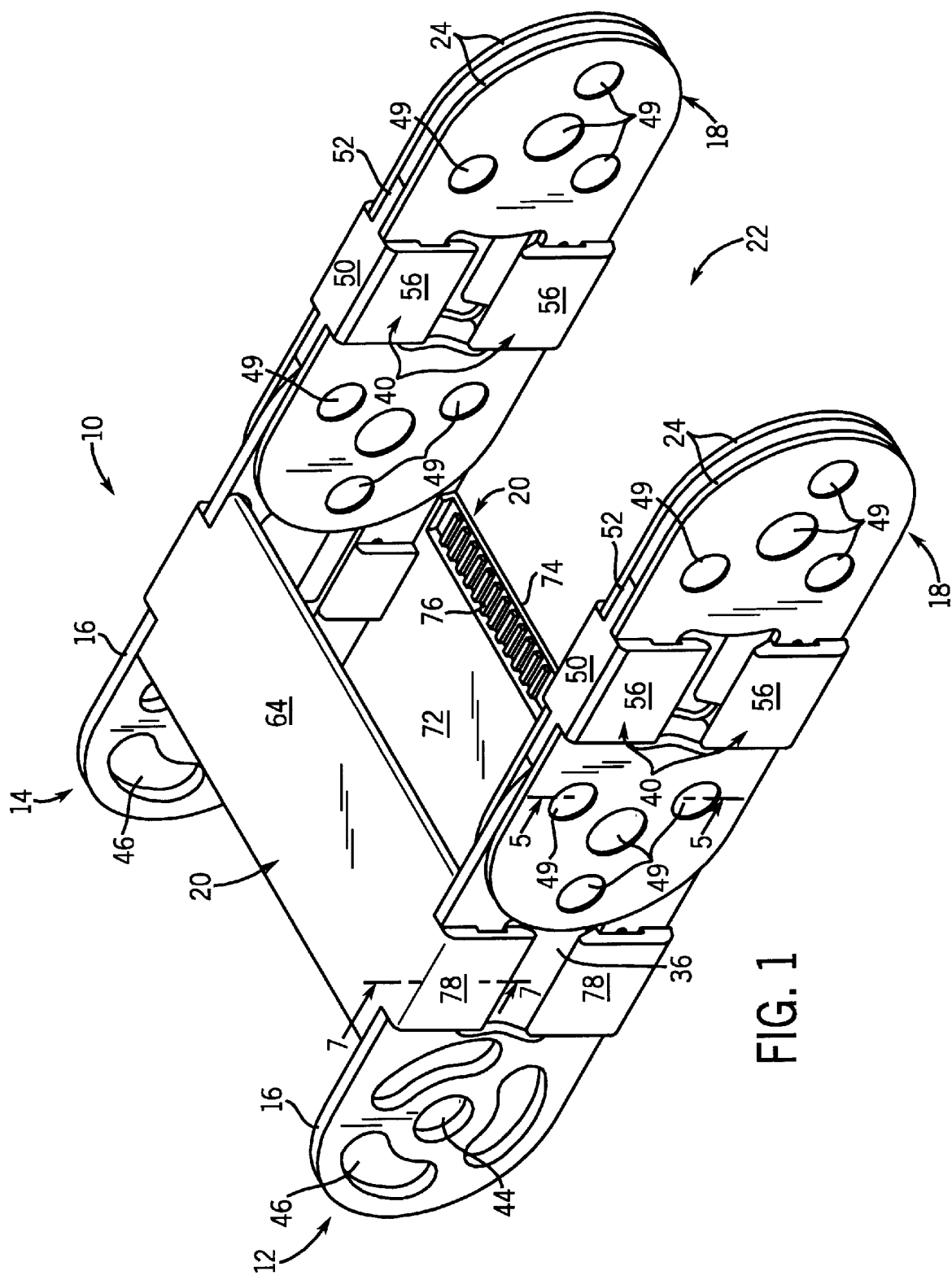
FIG. 1 is a perspective view of a cable carrier of the present invention.
Figure 2:
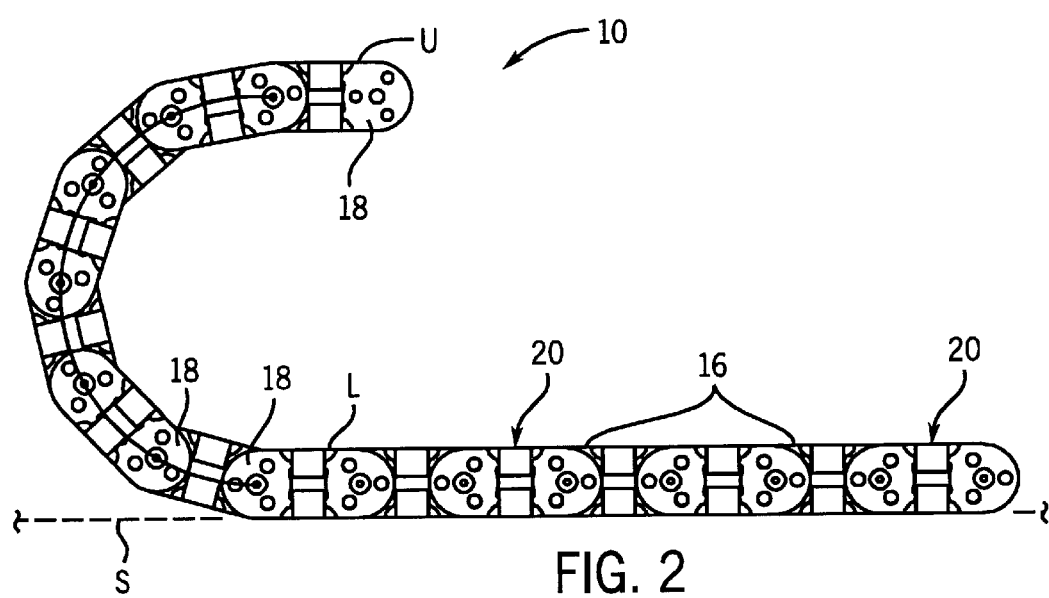
FIG. 2 is a side elevation view of the cable carrier of FIG. 1 shown fully pivoted.

FIG. 1 illustrates a cable carrier 10 for supporting and enclosing flexible hoses, cables or other conduit (not shown) typically used to supply energy, e.g., electrical, hydraulic, or pneumatic, to machines that move back and forth in a relatively straight line. In accordance with the invention, the carrier 10 bends only in one, typically upward, direction from a generally straight position, and thus, the upper run U of the carrier is able to span distances without collapsing (see FIG. 2). The lower run L is typically supported by support S.

The carrier 10 has a first chain 12 and a second chain 14 formed by interconnected inner 16 and outer 18 links, which are pivotally joined end to end in the longitudinal direction. At least two parallel cross-bars 20 laterally unite the first chain 12 with the second chain 14 to define a cargo space 22 in which the cables are carried.

The chains 12, 14 are identical as are all inner links 16 and all outer links 18. The outer links 18 are comprised of two identical halves 24. The material make-up (preferably steel) and outline of the inner links 16 and the outer link halves 24 are the same. Accordingly, the common features of the links will be described only once, and any variations between the inner 16 and outer link halves 24 will be separately described.

Figure 3:
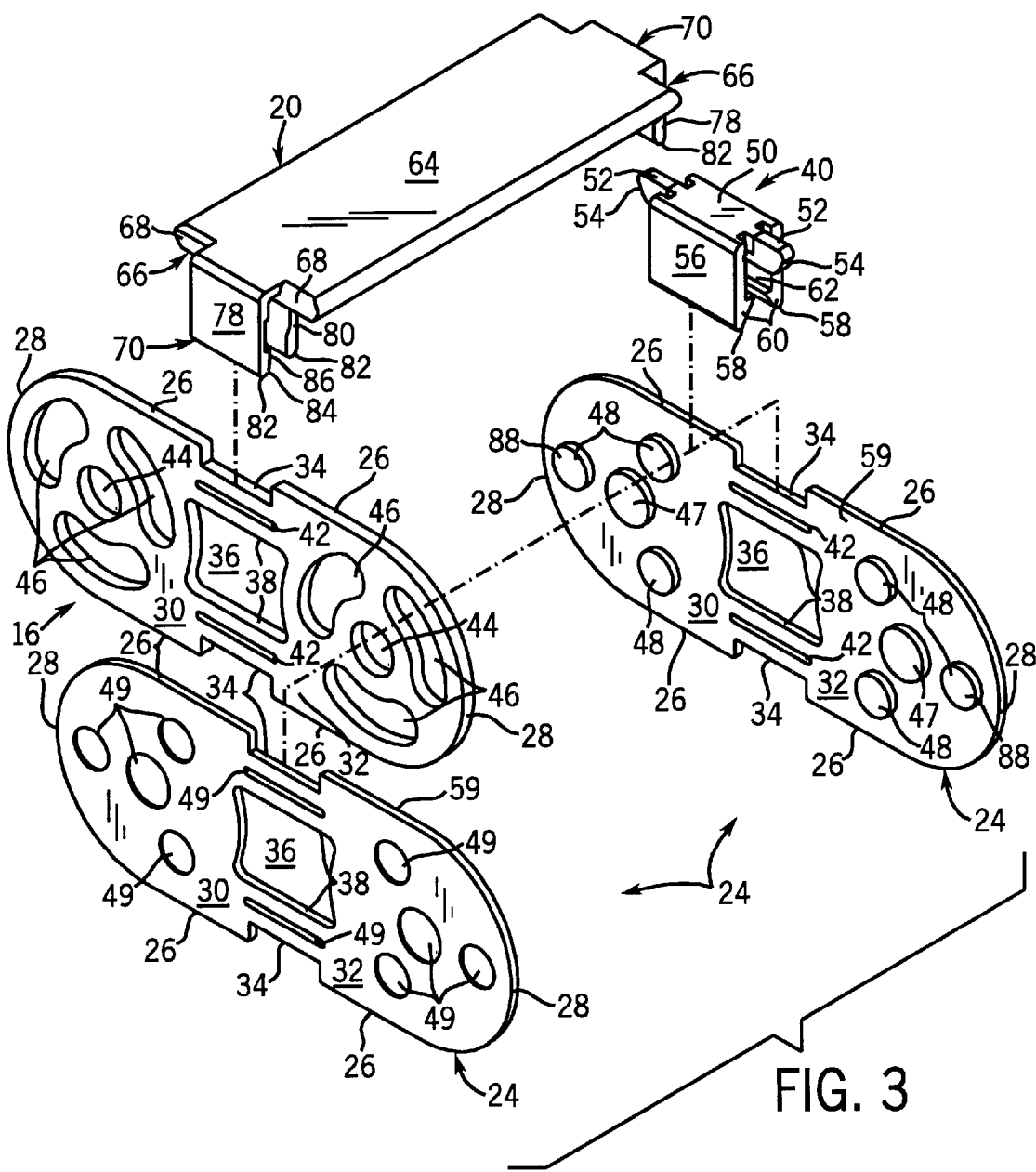
FIG. 3 is an exploded assembly view of inner and outer link halves of two pivotally connected chain links of FIG. 1, also showing one cross-bar and one retainer clip, it being understood that two cross-bars and four retainer clips would normally be used for each set of connected inner and outer links, as shown in FIG. 1.

Referring to FIG. 3, generally the links 16, 24 are flat, pill-shaped (oblong) metal plates having a perimeter with straight, parallel edges 26 joined by semi-circular edges 28 at opposing first 30 and second 32 ends. The inner links 16 are approximately ⅛" thick, roughly one and one-half times the thickness of the outer link halves 24. Along the longitudinal center line of the links 16, 24 are disposed two opposing notches 34 and a central aperture 36, which combine to define two parallel, arms 38 joining the ends 30 and 32. The notches 34 in the inner links 16 receive the cross-bars 20 for laterally joining a pair of chains. The notches 34 in the outer link halves 24 receive retainer clips 40 for maintaining the outer link halves 24 joined to mating inner links 16. The central aperture 36 eliminates excess material in order to reduce the weight of the chains 12, 14, and in turn, the carrier 10. Raised (stamped) stiffening ribs 42 are stamped at the transverse center of the arms 38 to increase the rigidity and strength of the links 16, 18.

Figure 8:
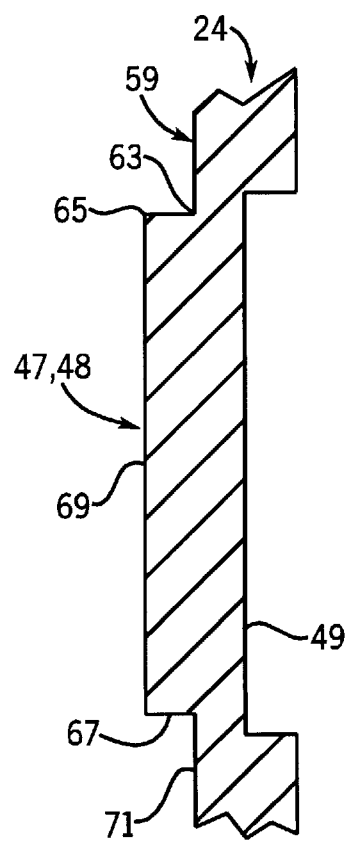
FIG. 8 is an enlarged detail view of a stop or pivot post according to the present invention.

Referring to FIG. 3, in the inner links 16, a circular pivot bore 44 is disposed at the pivot axis at the center of each end 30 and 32. Radially spaced around, and concentric with, the pivot bores 44 are three kidney bean shaped arcuate slots 46. Correspondingly, the outer link halves 24 have circular, raised (stamped) pivot posts 47 disposed at the pivot axis essentially at the center of each end 30 and 32, concentrically disposed around which are three raised (stamped) circular stop posts 48. The stops 48 project slightly less than one half the thickness of the inner links 16. For example, in one embodiment, the inner link was nominally 0.120 inches in thickness (11 gauge), the outer link halves were nominally 0.075 inches in thickness (14 gauge), and the posts (both stop 48 and pivot 47) extended 0.040 inches from the inside surfaces 59 of the outer link halves 24. The pivot posts 47 and stop posts 48 have diameters slightly smaller than the pivot bores 44 and slots 46, respectively, so as not to bind therein, The pivot 47 and stop 48 posts are formed by a half-shear stamping process which creates depressions 49 in the link halves 24 on the side opposite the inside surface 59, opposite from the pivot posts 47 and stop posts 48. The depressions 49 formed by this process are larger in inside diameter as shown in FIG. 8 than the outside diameter of the posts 47 or 48 which they are opposite from. For example, in the aforementioned one embodiment, the depressions were 0.378 inches in diameter and the posts were 0.370 inches in diameter. The ribs 42 are also stamped into the links 18 and 24, although by a forming operation which creates finite radiuses, and the depressions opposite from the ribs 42 are also identified by reference number 49.

Figure 5:
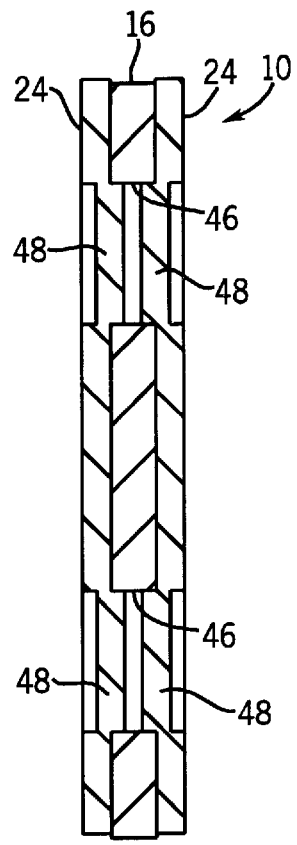
FIG. 5 is a cross-section taken along line 5—5 of FIG. 1, showing posts of the outer link halves disposed within the inner link slots.

As shown in FIG. 5, the stop posts 48 extend into the slots 46 from opposite sides of the link 16 so as to abut the ends of the slots 46 and limit the pivoting of the chain. Tile stops 48 extend into the slots 46 in similar manner to create a pivot connection.

Referring particularly to FIG. 8, the posts 47, 48 are formed with a sharp 90° inside corner 63 and outside corner 65. As such, the inside radius at the corner 63 and the outside radius at the corner 65 are both substantially equal to zero, the side surface 67 of each post 47, 48 meets the end surface 69 of the post in a sharp 90° angle at outside corner 65 and the side surface 67 of each post 47, 48 meets the surrounding inner surface 71 of each outer link 24 in a sharp 90° angle at inside corner 63.

Typical stamping processes vised to form cable carrier chain links have been those that bend or draw the sheet metal, known as coining processes. These result in radii at the inside and outside corners of the pivot posts and stop posts. Radii at the corners 63 and 65, particularly at the corner 63, result in reduced load carrying capacity, as those radii tend to cam the inner link 16 away from the adjacent outer link 24, which in failure results in the inner link slipping between the faces 69 of facing posts 47 or 48. As a countermeasure, facing posts have typically been welded together, which requires an additional welding process in manufacturing. The "bent-in" posts also lacked sufficient laterally flat side surface areas on the side surfaces of the posts to interface with the side surfaces of the openings in the inner links. This could result in binding and reduced load Carrying capacity.

Sheet metal forming operations suitable for forming posts of the invention include partial blanking operations such as the half-shear operation mentioned above, in which the material is sheared less than all of the way through by a punch entering the material from the depression 49 side and pushing the material into a die cavity on the post side of the same diameter as the post, to create the posts. Such posts have sharp corners joining their side surfaces to the surrounding surface 71 at the inside corners 63 and to the facing surface 69 at the outside corners 65. It may also be possible to from the posts with sharp 90° corners using a cold forming operation in which the sheet metal material is cold-flowed into the desired right angle shapes.

Figure 4:
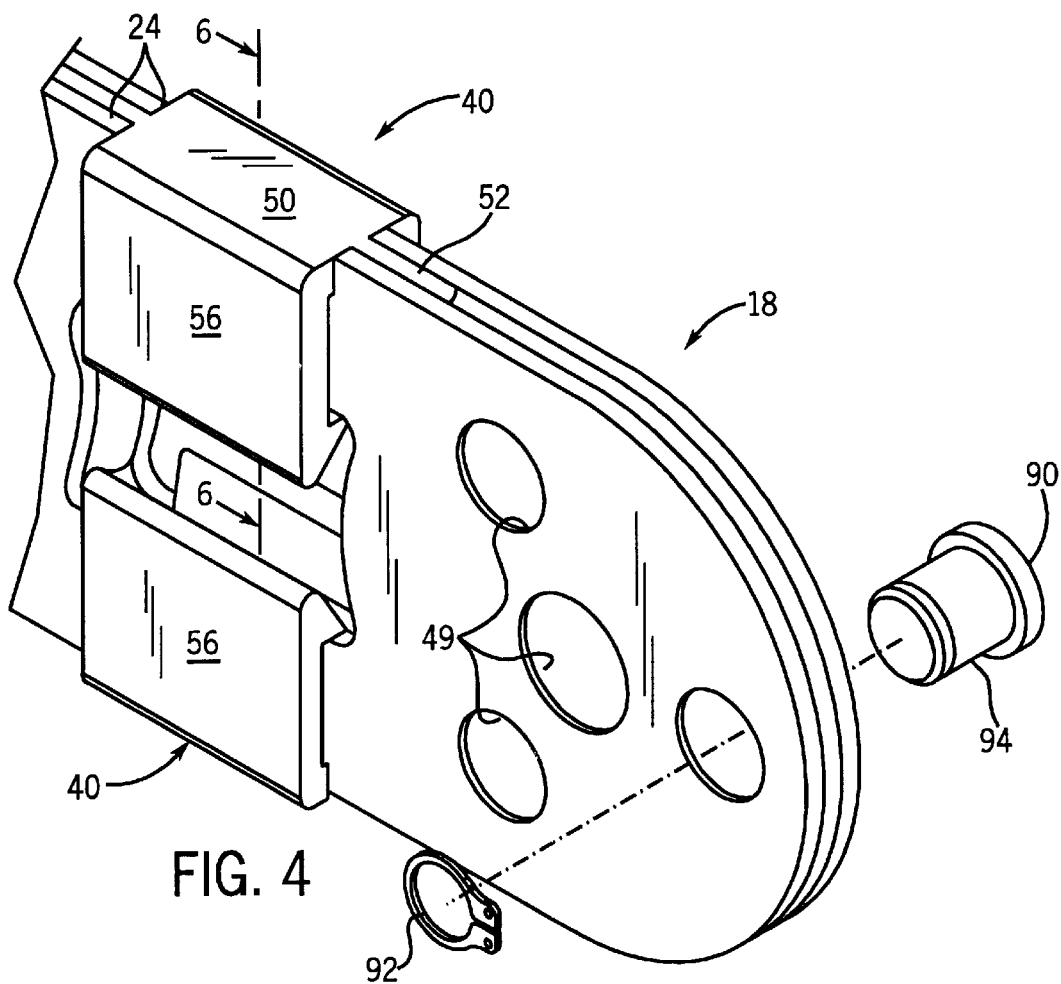
FIG. 4 is a cut-away assembly view of two outer link halves (without the inner link for clarity) illustrating an optional locking pin and snap ring stop connection.
Figure 6:
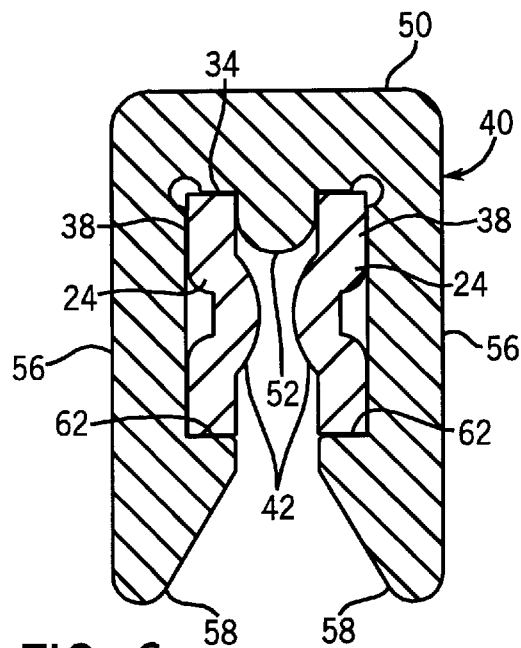
FIG. 6 is a cross-section taken along line 6—6 of FIG. 4, showing the connection of a retainer clip to outer link halves.

Referring to FIGS. 3, 4 and 6, the retainer clips 40 are preferably molded from a suitably rigid plastic material having a relatively low specific gravity, such as glass-filled nylon. The retainer clips 40 have a planar edge surface 50 with a longitudinal dimension slightly smaller than the notches 34 and a lateral dimension slightly larger than the thickness of the outer links 18. Depending from the longitudinal center-line of the planar surface 50 is a central rib 52 having tapered ends 54 that extend longitudinally past the planar surface 50 a distance so as not to interfere with the pivot of the inner links 16 when assembled. The central rib 52 has a thickness slightly less than that of the inner links 16. Depending from the longiitudinial edges of the planar surface 50 are two opposing side walls 56 having an increased longitudinal dimension. The side walls 56 extend to outwardly tapering ends 58 which facilitate snapping the retainer clip 40 over the arms 38 of the outer link halves 24. A projecting catch 60 extends from the tapered ends 58 to define a longitudinal ledge 62 at a transverse distance from the planar surface 50 slightly larger than the transverse dimension of the arms 38 of the outer link halves 24.

Interconnecting inner 16 and outer links 18 brings the stamped pivot 47 and stops 48 in end 30 of the opposing outer link halves 24 within the pivot bore 44 and slots 46, respectively, in end 32 of the inner link 16 (FIG. 5). One retainer clip 40 is fit within each set of notches 34 in the outer link halves 24, flush with the longitudinal edges 26, with the central ribs 52 between the halves 24 and the side walls 56 outside of the halves so that the catches 60 fit over the inner edges of the arms 38. The retainer clips 40 hold the halves 24 together, while spacing them apart, so as to maintain the outer link halves 24 in engagement with the inner links 16. The slots 46 and stops 48 are aligned so that when interconnected links are in a substantially straight, non-pivoted position, the stops 48 make edge-wise contact with the ends of the slots 46. Specifically, when straight, the stops 48 of end 30 contact the clockwise-most end of the slots 46, while the stops 48 of end 32 contact the counter-clockwise-most end of the slots 46. As mating links rotate about the pivot axis, the stops 48 slide within the slots 46 until they make edgewise contact with the opposite end of the slots 46. Thus, the are length of the slots 46 prescribe the radius through which the carrier 10 can pivot (see FIG. 2). Additionally, the slots 46 and stops 48 can be made to bias each coupled link 16 and 18 in the pivot direction. This creates a camber in the chains 12, 14 so that when the carrier 10 is filled with conduit, the load on the unsupported portion of the carrier 10 does not cause the carrier 10 to sag excessively.

Figure 7:
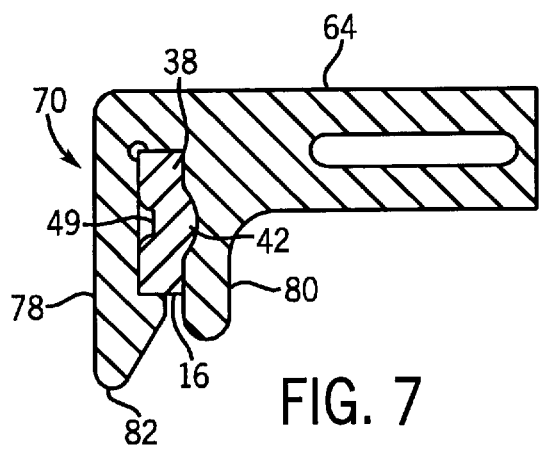
FIG. 7 is a break-out cross-section taken along line 7—7 of FIG. 1, showing the connection of a cross-bar to an inner link.
Figure 9:
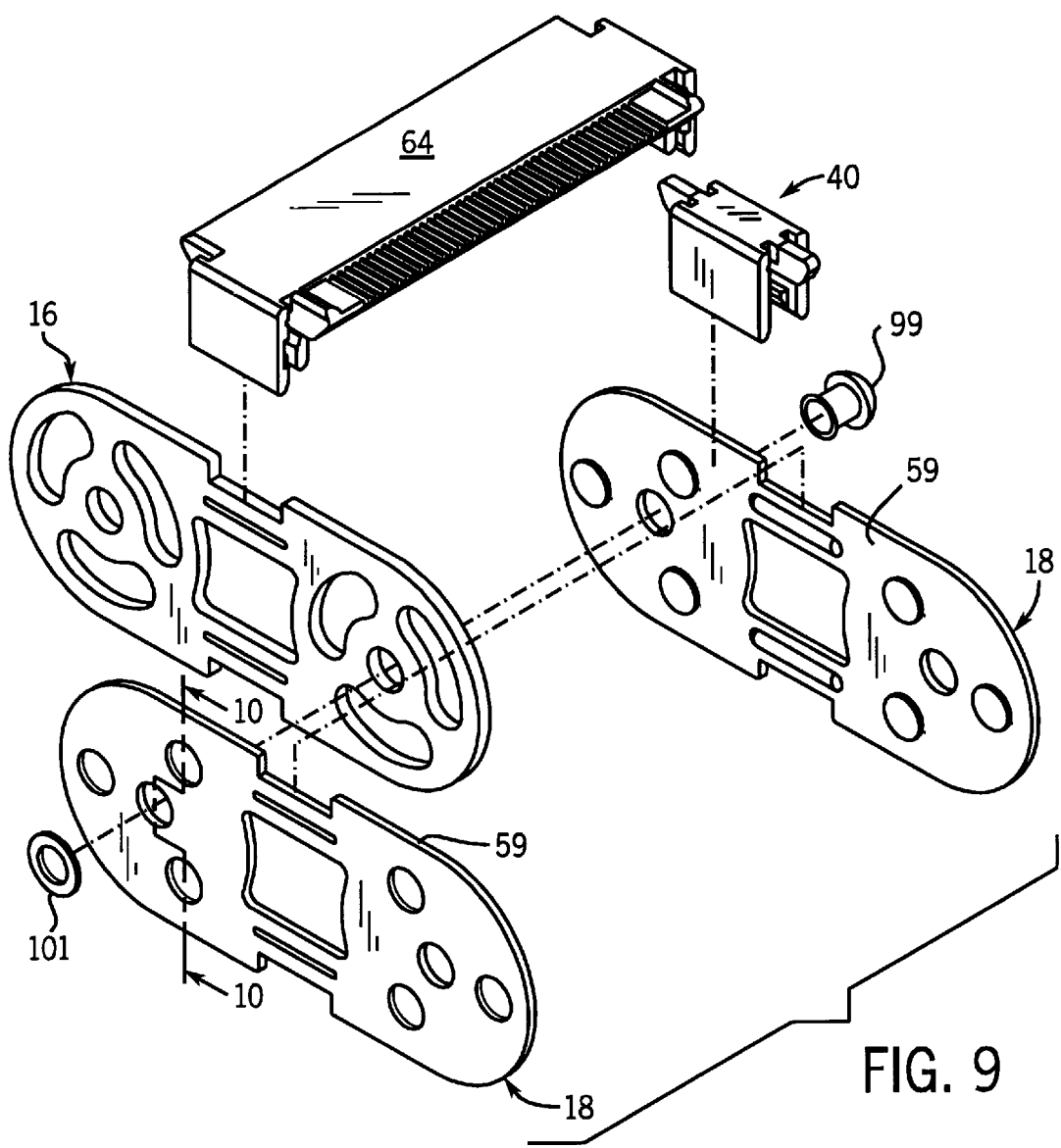
FIG. 9 is a view similar to FIG. 3 of an alternate embodiment of a chain according to the present invention.

As with the retainer clips, the cross-bars 20 are preferably molded from a rigid plastic material, such as glass-filled nylon, and can be formed in various lengths so as to vary the width of the carrier 10. With reference to FIGS. 1, 3 and 7, the cross-bars 20 have a planar member 64 having lateral ends 66 defined by end walls 68 and central transverse latches 70. On an inner surface 72 along lateral edges 74 are recessed rows of reinforcing rib-like projections 76, which hold separators (not shown) in place laterally which may be assembled between the upper and lower cross-bars 20. In the embodiment of FIG. 9, the ribs 76 are on the outside of the crossbars 20.

The latches 70 have outer 78 and inner 80 opposing side walls with tapered ends 82. The side walls 78, 80 have a longitudinal dimension slightly less than the notches 34 and include projecting longitudinal catches 84 defining ledges 86. The ledges 86 are located in the side walls 78 at a distance from the planar member 64 that is slightly treater than the transverse dimension of the arms 38 in the inner links 16. The first 12 and second 14 chains of the links 16, 18 are laterally connected by the cross-bars 20 by inserting the latch ends 70 into the notches 34 of the inner links 16 so that the catches 84 snap around the arms 38. No catches are provided on the inner walls 80 to facilitate disassembly of the cross-bars 20.

Figure 10:
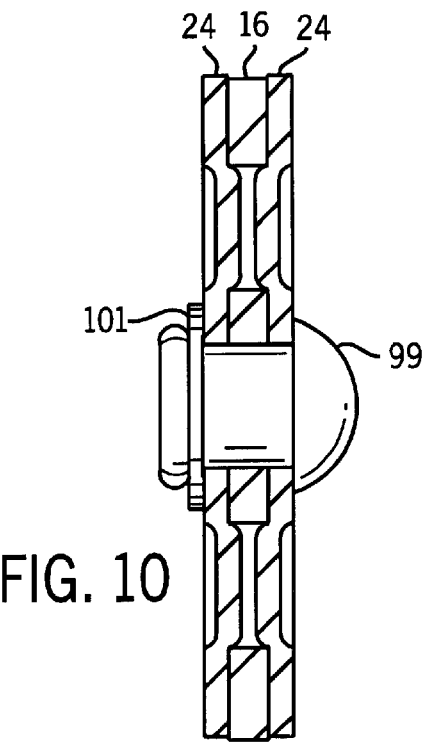
FIG. 10 is a detail cross-sectional view from the plane of the line 10—10 of FIG. 9, with the chain assembled.
Figure 11:
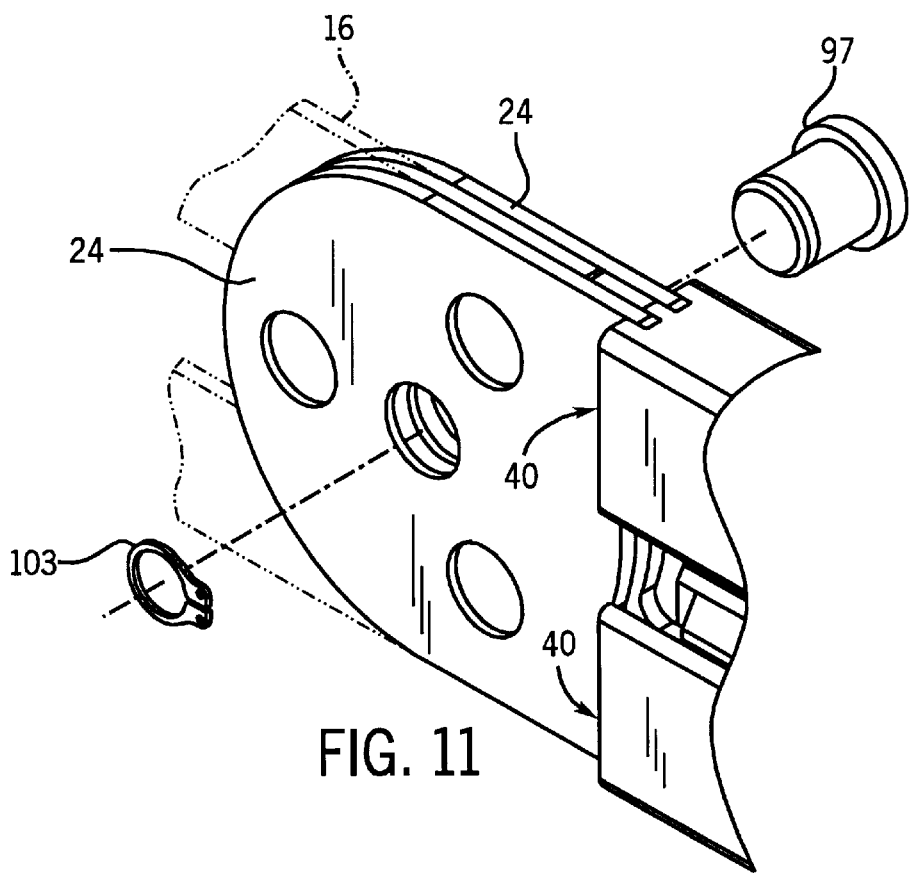
FIG. 11 is a fragmentary detail view illustrating the embodiment of FIG. 9 with a pivot pin rather than a rivet.

Referring to FIG. 4, for applications requiring extraordinary loading or unsupported span distances, outer link halves 24 can be made so that a bore (not Shown) replaces one or more outermost stops 88 (shown in FIG. 2) in each end 30 and 32. Pins 90 can be inserted through the bores and held in place by snap rings 92 disposed in circumferential grooves 94 in the pins 90. The pins 90 provide additional support to the retainer clips 40 to prevent the links from separating in extreme loading or spanning conditions. A rivet 99 and washer 101 as shown in the embodiment of FIGS. 9 and 10, or a pin 97 and spring clip 103 as shown in FIG. 11, may as an alternative be provided through pivot holes provided at the positions of the pivot posts 47. A rivet, pin or other pivot connection may be provided instead of one of the post pairs 47, 48 per set of link ends, although this adds weight and is more costly than using the post pairs 47, 48. It should be noted that through-bores provided at the positions of the posts may also be used to make connections to the chains, for example, to the links at the ends of the chains to fix them to a machine frame or movable head.

Figure 12:
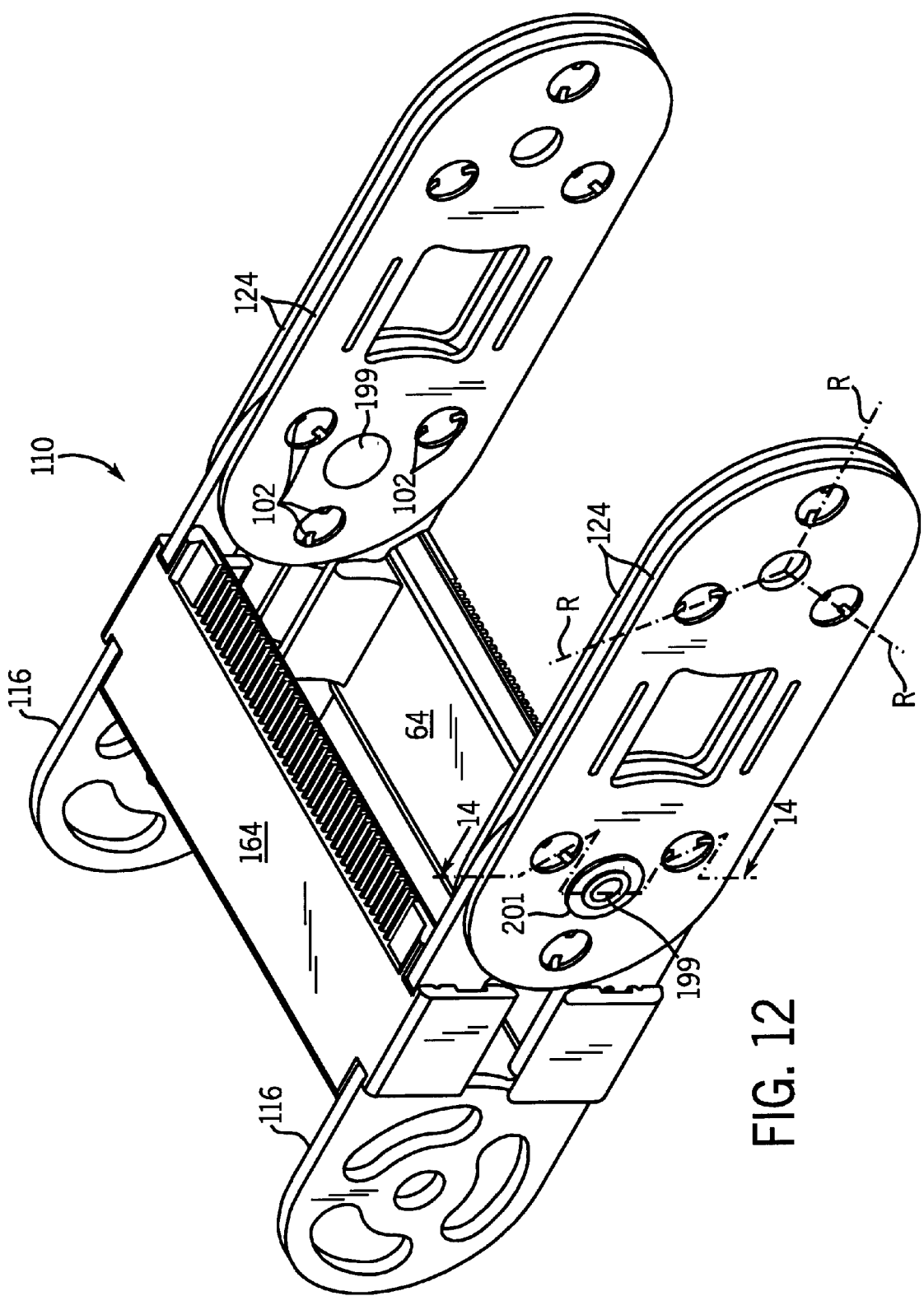
FIG. 12 is a perspective view similar to FIG. 1 of another alternate embodiment of a chain according to the present invention.
Figure 13:
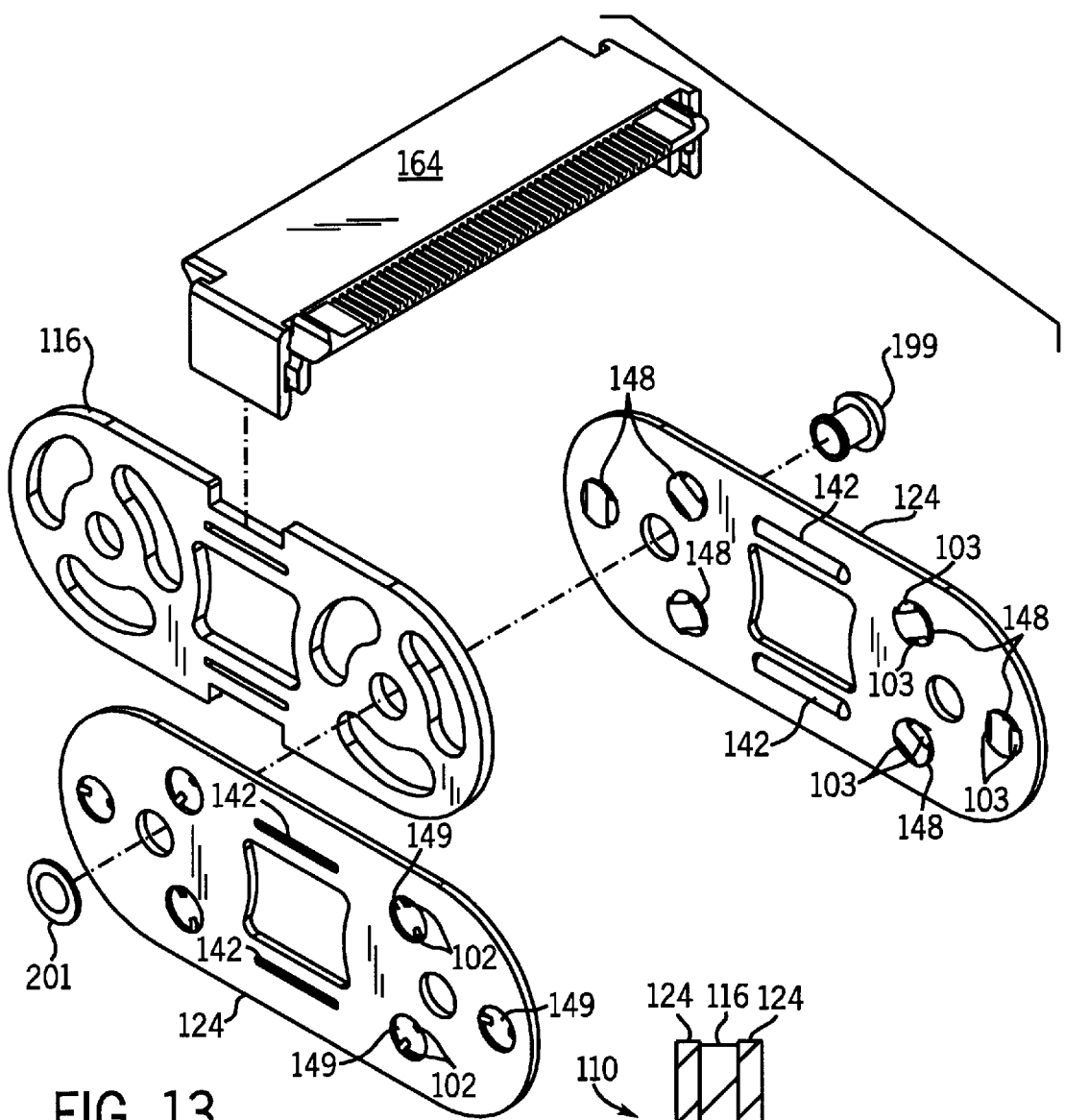
FIG. 13 is an exploded perspective view similar to FIG. 3 of the embodiment of FIG. 12.
Figure 14:
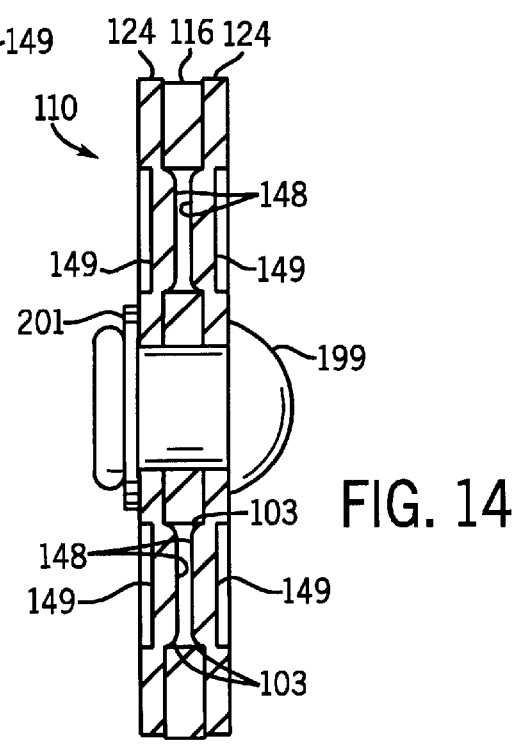
FIG. 14 is a fragmentary cross-sectional view through the plane of the line 14—14 of FIG. 12.

FIGS. 12–14 illustrate another embodiment 110 of a chain of the invention. Elements of this embodiment corresponding to elements of the previously described embodiments are labeled with the same reference number plus 100.

The chain 110 is essentially the same as the previously described chains except that the plastic retainer clips 40 and corresponding notches 34 are removed, and all pivot joints at both ends of each link are connected with a fastener such as a rivet 199 and washer 201 (as illustrated) or pin 97 and retainer clip 103 (like in FIG. 11) which prevents the pivot joints from coming laterally apart, while permitting relative rotation between the connected outer links 118 and inner links 116. In addition, the stop posts 148 are each formed to have a pair of opposed straps 102 integral with them on their outer surfaces.

The elimination of the clips 40 and corresponding notches 34 in the plates 24 increases the resistance of the plates 24 to buckling in the area of the arms in which the ribs 142 are formed. Without the clips 40, other pivot connection means, e.g., a pivot pin such as a rivet 199/washer 201 or pin 97/clip 103 through holes in the plates 16, 24 at the pivot axes of the chain 110, are provided. Thus, in the embodiment 110, the pivot posts 47 of the previous embodiments are replaced with holes and pivot pins at both ends of each plate 24.

The straps 102 provide a relatively smooth and continuous connection between the stop posts 148 and the metal of the surrounding part of the plates 124, without a sharp corner or shearing of the metal of the strap 102, as at other places around the periphery of the posts 148. Thus, each strap 102 joins each stop post 148 to the surrounding part of the plate 124 with a relatively large radius in the depression 149, as shown in cross-section in the lower half of FIG. 14. This reinforces the strength of the connection between stop posts 148 and the plates 124, particularly its fatigue strength. In addition, the straps 102 are less susceptible to corrosion failure than the sharp corners of the stop post 148.

The formation of the straps 102 makes it difficult to form sharp 90° corners on the stop posts 148 at the inside surface (the surface on the side of the plates 124 which the posts 148 project from) of the plates 124 directly opposite from the strap 102. Thus, edges 103 on the inside surface are illustrated as flattened or rounded. Sharp corners on the stop posts 148 opposite from each strap 102 are not necessary if the straps are oriented radially relative to the pivots of the chain 110, as illustrated in FIGS. 12 and 13. Thus, the straps 102 of each stop post 148 are positioned along a line R which is radial to the pivot axis of the plate in which the stop posts are formed. This positions the sharp inside and outside corners of the stop posts 148, which are 90° from the straps 102 (see the cross-sectional shape of the stop posts 148 in the top half of FIG. 14), at the ends of the slots 46 in the extreme positions of the pivoting of the chain 110.

Illustrative embodiments of the invention have been described in considerable detail for the purpose of disclosing a practical, operative structure whereby the invention may be practiced advantageously. The apparatus described is intended to be illustrative only. The novel characteristics of the invention may be incorporated in other structural forms without departing, from the scope of the invention as defined in the following claims.

We claim:

1. In a carrier for supporting energy transmission lines having at least two parallel articulated chains joined laterally to have coaxial pivot axes, each chain being made of inner links pivotally connected end to end to outer links, each outer link including a first half and a second half, each inner link having at least one end being sandwiched between ends of said first and second outer link halves which are pivotally connected to said end of said inner link, the improvement wherein said first and second outer link halves are joined together by a retainer clip and wherein said retainer clip is received in a recess in an edge of said outer link.

2. In a carrier for supporting energy transmission lines having at least two parallel articulated chains joined laterally to have coaxial pivot axes, each chain being made of inner links pivotally connected end to end to outer links, each outer link including a first half and a second half, each inner link having at least one end being sandwiched between ends of said first and second outer link halves which are pivotally connected to said end of said inner link, the improvement wherein said first and second outer link halves are joined together by a retainer clip, said first and second outer link halves have a cored center and wherein said retainer clip is snapped over arms defined by said cored center.

3. The improvement of claim 2 wherein said arms have stiffening ribs.

4. In a carrier for supporting energy transmission lines having at least two parallel articulated chains joined laterally to have coaxial pivot axes, each chain being made of inner links pivotally connected end to end to outer links, each outer link including a first half and a second half, each inner link having at least one end being sandwiched between ends of said first and second outer link halves which are pivotally connected to said end of said inner link, the improvement wherein said first and second outer link halves are joined together by a retainer clip, cross-bars join said inner links of said two chains, said inner links have a cored center and wherein said cross-bars have latch ends that are clipped to arms defined by said cored center.

5. The improvement of claim 4 wherein said arms have stiffening ribs.

6. In a carrier for supporting energy transmission lines having at least two parallel articulated chains joined laterally to have coaxial pivot axes, each chain being made of inner links pivotally connected end to end to outer links, each outer link including a first half and a second half, each inner link having at least one end being sandwiched between ends of said first and second outer link halves which are pivotally connected to said end of said inner link, the improvement wherein said first and second outer link halves are joined together by a retainer clip wherein each said outer link includes two integral pivot posts, one at each end thereof coaxial with the pivot axis at said end, each said pivot post extending into a coaxial hole formed in the adjacent inner link.

7. The improvement of claim 6 wherein said pivot posts are stamped into said link so as to provide a sharp 90° zero radius corner where said pivot posts meet an inside surface of said link.

8. The improvement of claim 7 wherein a fastener extends through said pivot posts.

9. The improvement of claim 6 wherein each said outer link includes at least one integral stop post which extends into a slot formed in the end of the adjacent inner link.

10. The improvement of claim 9 wherein each said outer link includes an end hole for receiving a pin which extends through said slot in said end of said adjacent inner link, said pin being secured in place by a retaining ring.

11. The improvement of claim 9 wherein said stop post is stamped into said link so as to provide a sharp 90° substantially zero radius corner where said stop post meet an inside surface of said link.

12. In a carrier for supporting energy transmission lines having at least two parallel articulated chains joined laterally to have coaxial pivot axes, each chain being made of inner links pivotally connected end to end to metallic outer links, each outer link including a first half and a second half, each inner link having at least one end being sandwiched between ends of said first and second outer link halves which are pivotally connected to said end of said inner link, said outer link halves having posts which extend into openings in said sandwiched ends of said inner links from opposite sides of said inner links, the improvement wherein at least one of said posts is integral with one of said outer link halves and has a side surface which is sheared out of and integral with said link and which intersects an inner surface of said one of said outer link halves in a sharp 90° substantially zero radius inside corner.

13. The improvement of claim 12, wherein at least two posts enter an opening in an inner link from both sides of said inner link and both of said posts are integral with the one of said outer links which is on the side of the inner link from which the post enters the opening in the inner link, and each said post has a side surface which is sheared out of and integral with said link and which intersects an inner surface of said integral one of said outer links in a sharp 90° substantially zero radius inside corner.

14. The improvement of claim 12, wherein said at least one of said posts has an end surface which is joined to said side surface by a sharp 90° substantially zero radius outside corner.

15. The improvement of claim 12, wherein a depression is formed on an outer surface of said outer link half opposite from said post and wherein said post and depression are circular, said depression having an inside diameter which is larger than all outside diameter of said post.

16. The improvement of claim 12, wherein at least one strap integrally connects said at least one stop post to said one of said outer link halves.

17. The improvement of claim 16, wherein said strap is oriented along a radial of a pivot of said one of said outer link halves.

18. The improvement of claim 12, wherein a depression is formed on an outer surface of said outer link half opposite from said post and wherein said depression is less in depth than the thickness of said outer link half.

\* \* \* \* \*

UNITED STATES PATENT AND TRADEMARK OFFICE
CERTIFICATE OF CORRECTION

PATENT NO. : 6,349,534 B1
DATED : February 26, 2002
INVENTOR(S) : Mark A. Zanolla et al.

It is certified that error appears in the above-identified patent and that said Letters Patent is hereby corrected as shown below:

Column 1,
Line 16, "Supporting" should be -- supporting --.
Line 32, "interfittinig" should be -- interfitting --.
Line 47, "Without" should be -- without --.

Column 2,
Line 25, "carrying," should be -- carrying --.

Column 4,
Line 58, "therein," should be -- therein. --.

Column 5,
Line 6, "Tile", should be -- The --.
Line 18, "vised", should be -- used --.
Line 33, "Carrying", should be -- carrying --.
Line 44, "from", should be -- form --.
Line 59, "longiitudinal", should be -- longitudinal --.

Column 6,
Line 21, "are", should be -- arc --.
Line 46, "treater", should be -- greater --.
Line 56, "Shown", should be -- shown --.

Column 7,
Line 66, "departing, from", should be -- departing from --.

Column 8,
Line 62, "integral stop post", should be -- integral post --.

Column 9,
Line 1, "said stop post", should be -- said post --.
Line 3, "meet", should be -- meets --.

UNITED STATES PATENT AND TRADEMARK OFFICE
CERTIFICATE OF CORRECTION

PATENT NO.    : 6,349,534 B1
DATED         : February 26, 2002
INVENTOR(S)   : Mark A. Zanolla et al.

It is certified that error appears in the above-identified patent and that said Letters Patent is hereby corrected as shown below:

<u>Column 10,</u>
Line 13, "all", should be -- an --.
Line 15, "one stop post", should be -- one post --.

Signed and Sealed this

Fifth Day of November, 2002

*Attest:*

*Attesting Officer*

JAMES E. ROGAN
*Director of the United States Patent and Trademark Office*